July 24, 1928.
G. H. LELAND
MOTOR MOUNTING
Filed June 16, 1926    2 Sheets-Sheet 1
1,678,438
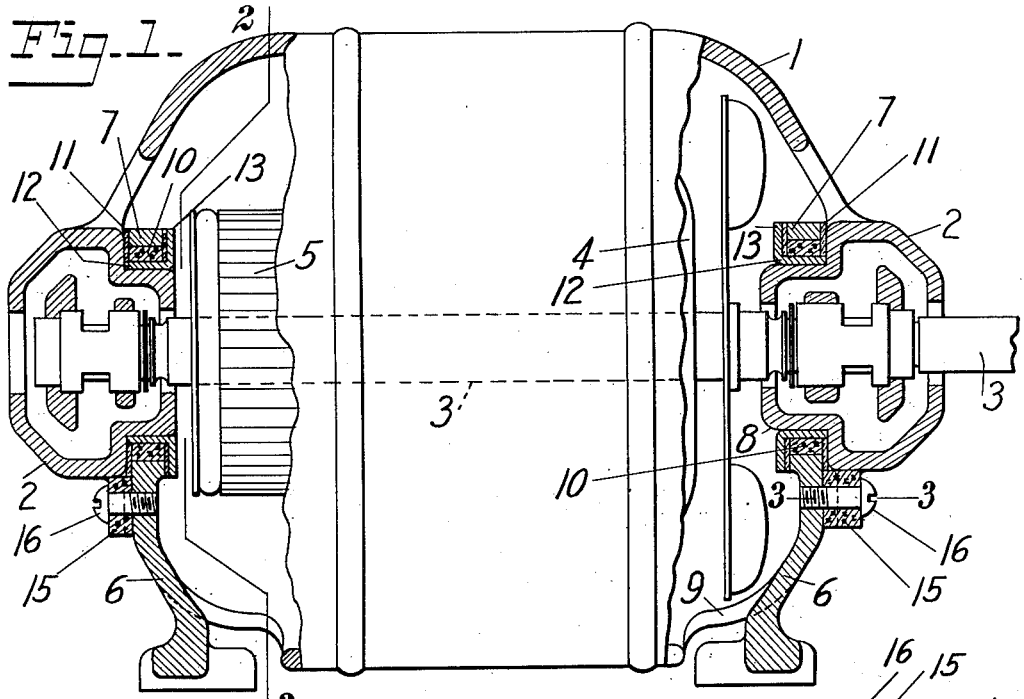
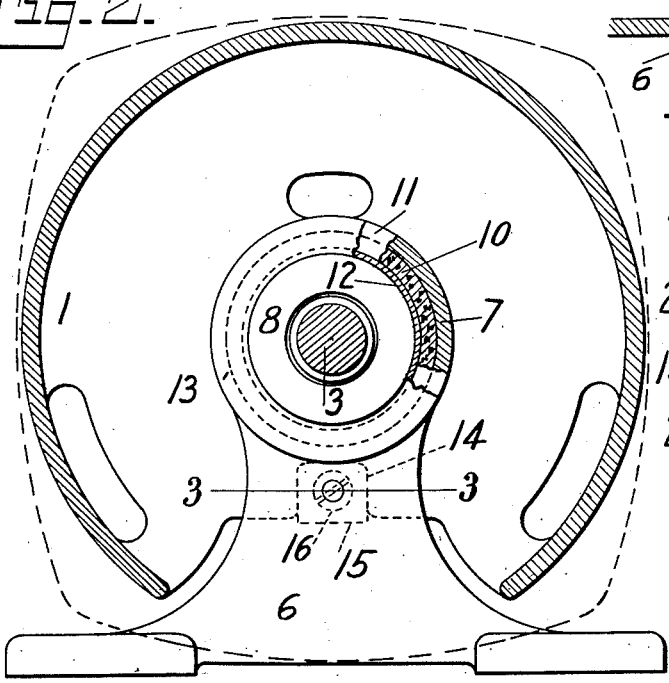
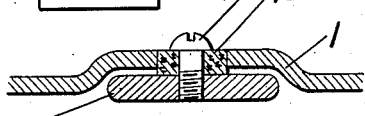
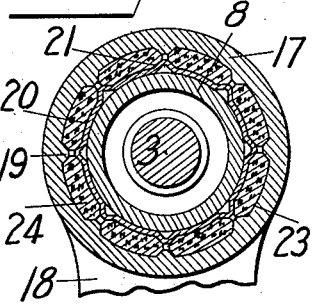
Inventor
GEORGE H. LELAND
By Edward C. Peck
Attorney July 24, 1928.  1,678,438
G. H. LELAND
MOTOR MOUNTING
Filed June 16, 1926    2 Sheets-Sheet 2
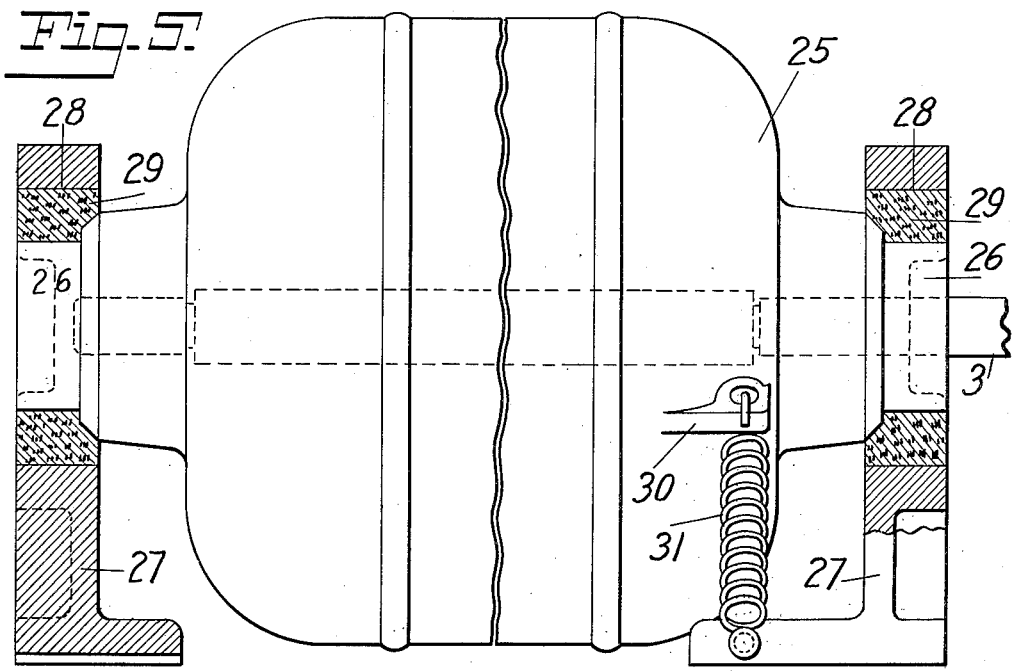
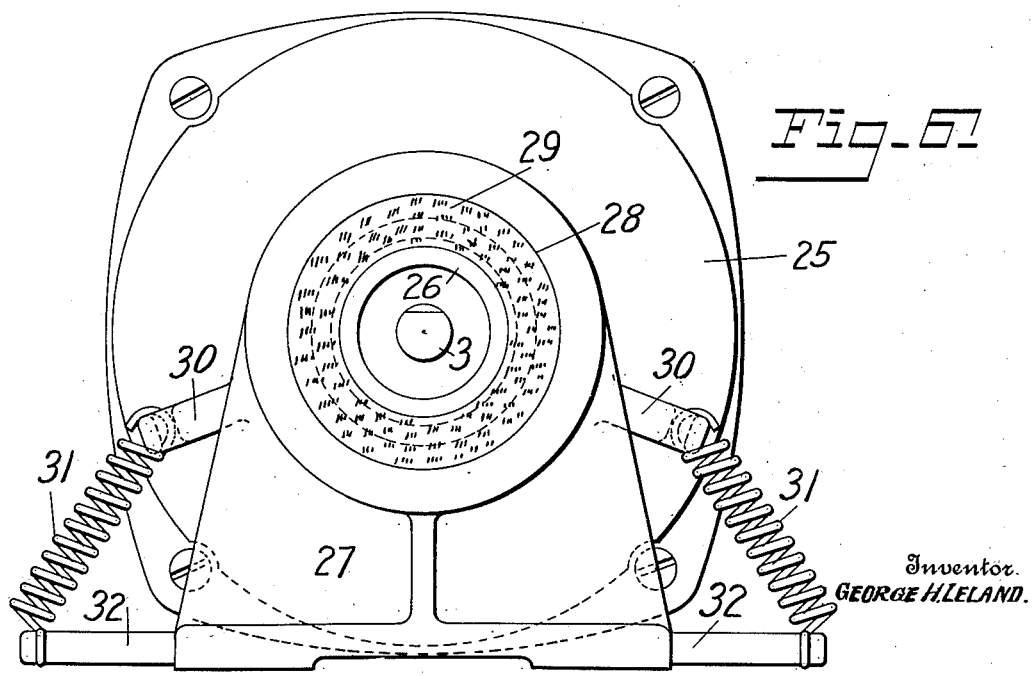
Inventor.
GEORGE H. LELAND.

Patented July 24, 1928.

1,678,438

UNITED STATES PATENT OFFICE.

GEORGE H. LELAND, OF DAYTON, OHIO, ASSIGNOR OF ONE-HALF TO THE LELAND ELECTRIC COMPANY, OF DAYTON, OHIO, A CORPORATION OF OHIO.

MOTOR MOUNTING.

Application filed June 16, 1926. Serial No. 116,342.

This invention relates to motor mountings and is designed more particularly for the purpose of eliminating the noise incident to the operation of an electric motor.

Alternating current motors, particularly of the single phase induction type, develop a torsional vibration in response to the pulsating power of the alternating current and while these vibrations are of themselves scarcely audible they are frequently transmitted to the machine or supporting structure with which the motor is associated so as to build up in such structure vibrations which become highly audible and noisy. Motors of this type are extensively used in connection with household appliances, such as electrically operated refrigerators, oil burners, water pumps and the like and when so used the noise is highly objectionable.

One object of the invention is to provide means which will prevent the transmission of these vibrations from the frame of the motor to the supporting structure, thereby eliminating, or very greatly reducing, the noise incident to the operation of the motor.

A further object of the invention is to provide such a device which will permit of torsional vibrations of the motor frame with relation to the supporting members and will yieldingly limit the continued rotation of the frame with relation to said supporting members.

A further object of the invention is to provide such a mounting which will be simple in its construction, inexpensive to install, compact in arrangement and which will not detract from the appearance of the motor as a whole.

Other objects of the invention will appear as the device is described in detail.

In the accompanying drawings Fig. 1 is a side elevation, partly in section, of a motor equipped with my invention; Fig. 2 is an end elevation of such a motor, partly broken away; Fig. 3 is a sectional view taken on the line 3—3 of Fig. 1; Fig. 4 is a sectional detail view showing a modification of the mounting of the yieldable material; Fig. 5 is a side elevation of a motor, partly in section, showing a further modification of the invention; and Fig. 6 is an end elevation of the motor of Fig. 5.

In these drawings I have illustrated one embodiment of my invention, with certain modifications thereof, but it will be understood that this particular embodiment has been chosen for the purposes of illustration only and that the mounting may take various forms without departing from the spirit of the invention.

In that embodiment of the invention which is illustrated in Figs. 1, 2 and 3, the motor comprises a main frame or casing 1 which supports the field coils and which has at its ends bearings 2 in which is mounted a shaft 3 which carries the armature 4 and commutator 5. In the usual motor construction the casing or main frame has rigidly secured thereto, and usually formed integral therewith, supporting standards or legs and the vibrations of the main frame are transmitted through these standards to the machine or base on which the motor is mounted, which serves to amplify the vibrations and to render the operation of the motor noisy. In the present construction I provide the motor with supporting standards, separate from the frame, as shown at 6, and so support the main frame upon said standards as to prevent the transmission of the vibrations to the standards. The standards may be of any suitable character but, as here shown, they are separate one from the other and each standard is provided near its upper end with an annular portion 7 provided with an opening adapted to receive a part carried by the main frame of the motor, this part being preferably in the form of a trunnion, as shown at 8. In the construction shown in Figs. 1 to 3 the parts or trunnions 8 of the main frame extend inwardly from the bearings 2 and the casing is provided in its lower portion with openings 9 through which the upper portion of the standards extend so that they may embrace the trunnions 8 within the main frame, thus providing a very compact arrangement of the structure and avoiding any material change in the appearance of the motor.

To prevent the transmission of the vibrations from the main frame to the standards I interpose yieldable material between the frame and the standards. As shown in Figs. 1, 2 and 3, this yieldable material comprises an annular body of cork or cork composition, as shown at 10, which is fitted within the annular portion 7 of the standard between the same and the trunnion 8. If desired, fiber washers 11 may be arranged at the respective sides of the annular portion of the standard and the body of yieldable material. The ring or annular body of yieldable material is secured in position within the annular portion of the standard by means of a bushing or liner 12 which fits within the same and which has an outwardly extending flange 13. This bushing 12 fits tightly about the trunnion 8 so that the trunnion can not rotate with relation thereto, and thus forms in effect a part of the trunnion or supporting structure for the frame. The operation of the motor tends to impart a rotatory movement to the main frame and a yieldable connection is interposed between the frame and the standards to resist this tendency to rotate. In the construction shown in Figs. 1, 2 and 3, the end wall of the main frame or casing has a recess 14 in which is fitted a section of yieldable material, such as cork or cork composition, as shown at 15. A screw 16 extends through this section of yieldable material and is threaded into the standard so as to rigidly connect the yieldable material with the standard. Thus the rotation of the main frame with relation to the standard is prevented without establishing a rigid connection between the frame and the standards.

In Fig. 4 of the drawings I have illustrated a construction in which the yieldable material which is interposed between the trunnion and the standard will in itself resist the tendency of the main frame to rotate. For this purpose the yieldable element which is interposed between the trunnion and the standard is of such a character that it will have separated parts which so engage the opposed surfaces of the trunnion and the standard that said parts of the yieldable element are held substantially against bodily movement with relation to the surfaces with which they are in contact. Consequently the yieldable element will yield, without shifting its points of contact with the trunnion and the standard, to permit of the torsional vibration of the frame, but will yieldingly limit the continued rotation of the frame, such rotation being permitted only to the extent of the yieldability of the yieldable element. The several parts of the yieldable element may or may not be entirely separate one from the other, it being only necessary that they have separated points of contact with the trunnion and the standard. In that form of the apparatus the annular portion 17 of the standard 18 is provided with inwardly extending projections or ribs 19, which preferably taper inwardly. The bushing 20, which fits tightly about this trunnion, is provided with a corresponding plurality of outwardly extending projections or ribs 21, the corresponding ribs of the two sets being arranged in radial alinement but being spaced one from the other. These two sets of projections or ribs divide the space between the trunnion 2 and the standard into a series of pockets 23 and in each of these pockets is mounted a section of yieldable material 24, the arrangement being such that these sections of yieldable material will serve both to prevent the transmission of vibrations from the main frame to the standards and to prevent the rotation of the main frame with relation to the standards.

It will be noted that the opening in the end wall of the main frame is partially closed by the standard and that this standard is so shaped as to conform substantially to the contour of said end wall and blends therewith. The standard thus forms a part of the fan housing and because of the uniform contour of the housing as a whole avoids certain noises which might result if there was a break or irregularity in the wall of the housing.

In Figs. 5 and 6 I have illustrated another modification of my invention in which the motor frame 25 is provided at each end with an outwardly extending part or trunnion 26. The standards 27 are arranged beyond the respective ends of the main frame and are provided with openings 28 to receive the parts 26 of the main frame. An annular body of yieldable material 29 is interposed between each trunnion or part 26 and the wall of the opening in the corresponding standard. The main frame or casing has secured thereto and preferably formed integral therewith, apertured lugs 30 and coiled springs 31 are connected with the respective lugs 30, extend outwardly and downwardly and are attached at their lower ends to laterally extending arms or pins 32, carried by the base of one of the standards 27, and serve to yieldably resist the tendency of the main frame to rotate.

While I prefer to use the yieldable material between the trunnions of the main frame and the standards it will be obvious that this may be omitted and that the yieldable devices which are interposed between the main frame and the standards, as shown at 15 in Figs. 1 to 3, and at 31 in Figs. 5 and 6, will absorb, to a greater or lesser extent, the torsional vibrations of the frame and prevent, to that extent, the transmission of these vibrations to the standard.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a motor, supporting standards having openings therein, a main frame having parts extending into said openings, an annular body of yieldable material arranged within the opening in each standard and serving to support the corresponding part of said frame on said standard, and means secured to said part of said frame for retaining said yieldable material in position on said standard.

2. In a motor, supporting standards having openings therein, a main frame having parts extending into said openings, an annular body of yieldable material arranged within the opening in each standard between the circumferential wall of said opening and said part of said frame, and an annular member arranged within each body of yieldable material and adapted to receive the corresponding part of said frame.

3. In a motor, a main frame having inwardly extending parts at the respective ends thereof, supporting standards extending into said frame and having openings to receive the respective parts of said frame, and yieldable material interposed between said standards and the respective parts of said frame.

4. In a motor, a casing having at its respective ends bearings to receive a motor shaft, having trunnions extending inwardly from said bearings and having openings in the lower portion thereof, supporting standards extending through the respective openings in said casing and having openings in the upper portions thereof to receive the respective trunnions, and yieldable material arranged within the opening in each standard between the wall thereof and the corresponding trunnion.

5. In a motor, supporting standards having openings therein, a main frame having trunnions extending into the openings in the respective standards, yieldable material interposed between the trunnions and the respective standards, said frame having recesses in the end walls thereof, sections of yieldable material supported in the respective recesses, and means for securing said sections of material to the respective standards.

6. In a motor, a main frame having trunnions at the ends thereof, supporting standards having openings to receive the respective trunnions, the wall of each opening having a plurality of inwardly extending projections, a bushing arranged within each opening, spaced from the wall thereof and having a corresponding plurality of outwardly extending projections, said projections on the wall of said opening and on said bushing serving to divide the space between said parts into a series of pockets, and sections of yieldable material mounted in the respective pockets.

7. In a motor, supporting standards, a main frame mounted on said standards for movement about the axis of said motor and having an opening therein, a yieldable device mounted in said opening, and means for securing said yieldable device to one of said standards, whereby said yieldable device will absorb the torsional vibrations of said frame.

8. In a motor, a casing having an end wall provided with an opening therethrough and having a trunnion, a standard having an opening to receive said trunnion, said standard being so shaped as to partially close said opening in said casing and to conform substantially to the contour of said end wall, and means to prevent the transmission of vibrations from said casing to said standard.

9. In a machine of the character described, a frame having a part forming a support, a supporting member extending about said part of said frame, and a resilient element interposed between said part of said frame and said supporting member and adapted to permit torsional vibration by said frame with respect to said supporting member and at the same time to resiliently limit the continued rotation of said frame with respect to said supporting member.

10. In a machine of the character described, a frame having an annular part forming a support therefor, a relatively stationary supporting member extending about said annular part of said frame, and a yieldable element interposed between said supporting member and said part of said frame and comprising separated parts having substantially fixed engagement with said supporting member and said part of said frame, whereby said element will yield to permit torsional vibration of the frame with relation to the supporting member but will yieldingly limit the continued rotation of said frame with relation to said supporting member.

11. In a machine of the character described, a frame having an annular part forming a support therefor, a relatively stationary supporting member extending about said annular part of said frame, and a yieldable element interposed between said supporting member and said part of said frame and comprising a plurality of separated parts, said supporting member and said part of said frame having seats to receive said parts of said yieldable member and hold the same against bodily movement with relation thereto.

In testimony whereof, I affix my signature hereto.

GEORGE H. LELAND.